Figure 1:
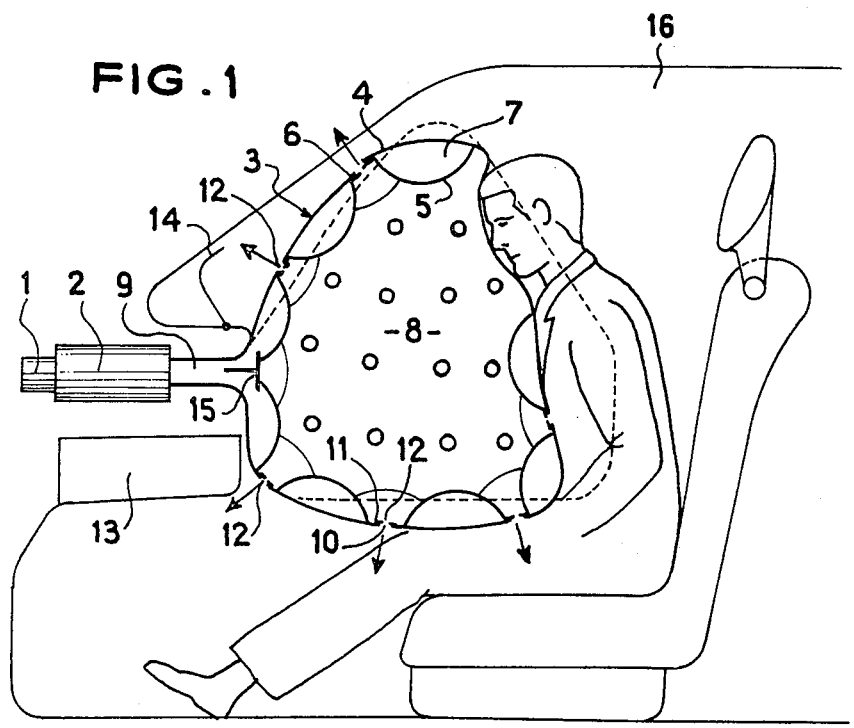

United States Patent [19]

Pech

[11] 3,907,327

[45] Sept. 23, 1975

[54] SAFETY DEVICE WITH AN INFLATABLE CUSHION WHICH PROVIDES EFFECTIVE PROTECTION DURING SUCCESSIVE COLLISIONS

[75] Inventor: Bernard M. Pech, Paris, France

[73] Assignee: Societe Nationale des Poudres et Explosifs, Paris, France

[22] Filed: Jan. 15, 1973

[21] Appl. No.: 323,948

[30] Foreign Application Priority Data
Jan. 19, 1972 France .............................. 72.01805

[52] U.S. Cl. .......... 280/150 AB; 5/348 R; 182/137; 188/1 B; 244/138 R
[51] Int. Cl.² ........................................ B60R 21/08
[58] Field of Search .......... 280/150 AB; 244/138 R; 188/1 B; 5/348 R; 182/137

[56] References Cited
UNITED STATES PATENTS

| | | | |
|---|---|---|---|
| 2,713,466 | 7/1955 | Fletcher........................... | 244/138 R |
| 2,974,912 | 3/1961 | Namsick .......................... | 244/138 R |
| 3,508,724 | 4/1970 | Scher............................... | 244/138 R |
| 3,511,519 | 5/1970 | Martin............................. | 280/150 AB |
| 3,675,942 | 7/1972 | Huber.............................. | 280/150 AB |
| 3,733,091 | 5/1973 | Fleck............................... | 280/150 AB |
| 3,744,815 | 7/1973 | Scherenberg................... | 280/150 AB |
| 3,762,741 | 10/1973 | Fleck............................... | 280/150 AB |
| 3,773,350 | 11/1973 | Shibamoto........................ | 182/137 |
| 3,792,873 | 2/1974 | Buchner......................... | 280/150 AB |

Primary Examiner—David Schonberg
Assistant Examiner—John P. Silverstrim
Attorney, Agent, or Firm—Bucknam and Archer

[57] ABSTRACT

A safety device with an inflatable cushion for moving vehicles, particularly automobiles, comprises at least one inflatable cushion, means for expanding and re-expanding the said cushion and a collision detector controlling the actuation of such a device, the cushion being equipped with means for transferring gas in both directions, at two different flow rates, between the surrounding atomosphere and the inside of the cushion, the gas exchange taking place at a low flow rate in the direction from the inside of the cushion to the surrounding atmosphere, for the purpose of deadening the person to be protected when the latter is thrown against the said cushion during an accident, and at a higher flow rate in the direction from the surrounding atmosphere to the inside of the cushion for the purpose of rapidly re-inflating the said cushion as soon as the latter is no longer acted upon by the person to be protected. The device is particularly effective in case of a series of impacts, because it is partially reversible and dissipates a part of the energy by absorbing gas and absorbing the rest of the energy to restore the device to its initial state before a new deadening of the person to be protected.

15 Claims, 15 Drawing Figures

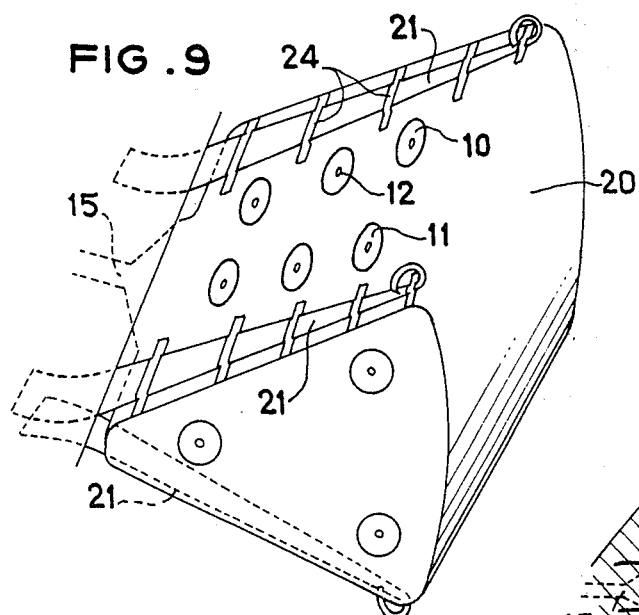
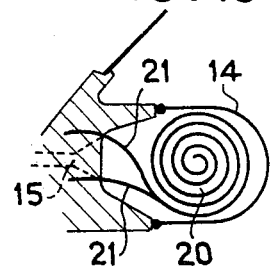
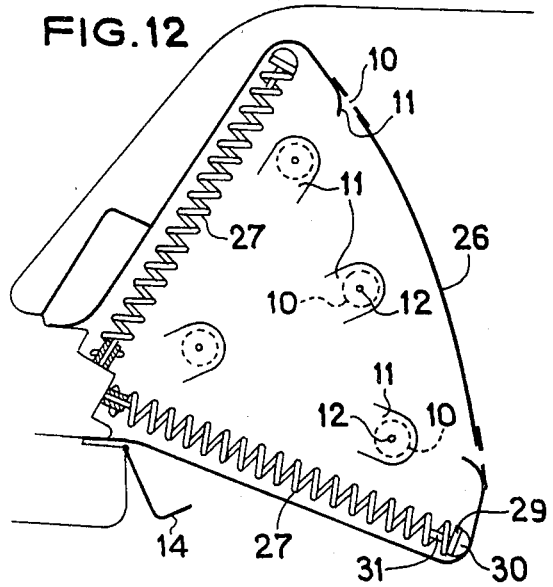
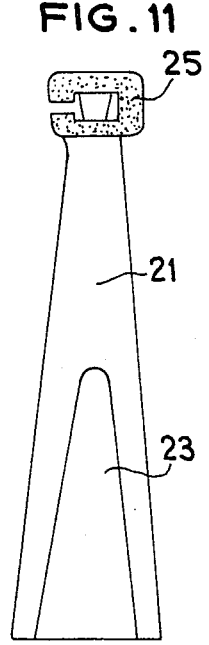

SAFETY DEVICE WITH AN INFLATABLE CUSHION WHICH PROVIDES EFFECTIVE PROTECTION DURING SUCCESSIVE COLLISIONS

The present invention relates to safety devices which are located inside different vehicles which travel at high speed such as automobiles, aeroplanes and the like, and which are intended to protect the occupants of the vehicles in the case of an accident involving, especially, sudden deceleration. These devices generally comprise a collision detector which actuates, within a very short response time, a source of gas under pressure which expands an inflatable cushion normally stored, with a small volume, opposite the person to be protected.

The invention relates more particularly to safety devices with inflatable cushions which make it possible to provide effective protection for the person to be protected during successive collisions. Numerous devices with inflatable cushions have been proposed hitherto for restricting the movements of the people to be protected, firstly by very rapidly inflating a flexible chamber in such a way as to hold the occupant of the vehicle in position, and thereafter, when the pressure exerted by this occupant on the chamber becomes very great, to deaden his movement by gas escape systems which absorb the kinetic energy and thus prevents him from rebounding. However, although such a system is relatively effective, it is gravely inadequate in the case of a series of impacts extending over several seconds. In effect, the cushion will always expel the gas which it contains but, in the devices proposed hitherto, this loss is never compensated by a new introduction of gas and the system is irreversible.

As a result of this, if the cushion is to be effective in every situation which can occur during an accident, and especially in the case of successive impacts, the rate of flow of the expelled gases must be restricted to ensure a sufficiently long deflation time, which leads to a decrease in the mass of gas expelled and an increase in the pressure prevailing in the cushion with all the dangers which that involves for the person to be protected, mainly in automobiles of the European type in which the volume of the inflatable cushion is restricted. Another type of inflatable cushion achieves the deadening of the person to be protected by means of irreversible systems which absorb the energy by permanent deformation of the partially metallic cushion or by permanent deformation of holding parts external to the cushion. Protection in the case of successive impacts necessitates restricting the deformations during the first collision, which leads to very hard receiving conditions for the person who is to be protected. Yet another type of inflatable cushion achieves the deadening of the person to be protected solely by elastic deformation either of the walls of the cushion or of holding pieces external to the cushion. Such a system is completely reversible and, after the person to be protected has been stopped by the cushion which absorbs the kinetic energy, the latter catapults the person back on his seat with all the dangers which that involves. This device provides "protection" whatever the number of successive impacts but it is much too dangerous and its use is impossible in rapid vehicles.

The safety device according to the invention makes it possible to overcome the absence of protection which the known devices possessed in the case of successive collisions undergone by a vehicle. Protection of the person is achieved whatever the number of impacts by a partially reversible device which dissipates a part of the energy by expelling gas and which absorbs the rest of the energy to restore the device to its initial state before a new deadening of the person to be protected, which makes it possible to produce deadening conditions which can be withstood easily by the human body, particularly in the case where the volume of the inflatable cushion is restricted by the size of the passenger compartment of the vehicle.

For this purpose, the safety device according to the invention comprises an inflatable cushion, a device for expanding and re-expanding the said cushion and a collision detector controlling the actuation of such a device; this cushion is, moreover, equipped with means which make it possible for gas to be exchanged in both directions, at two different flow rates, between the surrounding atmosphere and the inside of the cushion, gas exchange taking place at a low flow rate in the direction from the inside of the cushion to the surrounding atmosphere for the purpose of deadening the person to be protected when the latter is thrown against the said cushion during an accident, and at a higher flow rate in the direction from the surrounding atmosphere to the inside of the cushion for the purpose of rapidly re-inflating the said cushion as soon as the latter is no longer acted upon by the person to be protected.

More particularly, the means which make it possible for gas to be exchanged in both directions, at two different flow rates, between the surrounding atmosphere and the inside of the cushion, comprise:

Firstly, permanent orifices of low cross-section providing communication between the inside of the cushion and the surrounding atmosphere, and secondly, temporary orifices of larger cross-section, closed by valves which open only in the direction which admits air into the cushion.

The ratio of the total surface area of the temporary orifices of large cross-section to that of the permanent orifices of low cross-section is preferably between 150 and 200.

The valves which seal the temporary orifices are preferably of the membrane type.

According to a first embodiment of the safety device according to the invention, the device for expanding and reexpanding the cushion is of pneumatic nature; for this purpose, the inflatable cushion comprises two adjacent non-communicating chambers, maintained at different pressures at the time of use: namely (a) an inner chamber communicating with the atmosphere, on the one hand via permanent orifices of low cross-section and on the other hand via temporary orifices of large cross-section, closed by valves which open only in the direction which admits air into this inner chamber, and (b) an outer chamber which is connected to a source of gas under pressure, the actuation of which is controlled by a collision detector, and which encloses, at least partially, the inner chamber, the walls of these two chambers being firmly fixed to one another in a discontinuous manner, the outer chamber playing the role of a device for expanding and re-expanding the cushion when it is pressurized, the inner chamber being expanded by the pressurisation of the outer chamber and being pressurised itself by sucking in air from the surrounding atmosphere via the temporary orifices of large cross-section.

According to a characteristic of this first embodiment, the inflatable cushion consists of two walls of substantially equal dimensions, made of a flexible material, located one inside the other and connected to one another in a discontinuous manner by leakproof contact zones, preferably distributed over the entire area of the said walls, thus delimiting an outer chamber consisting of elementary volumes, all communicating with one another, and connected to the source of gas under pressure, and an inner chamber communicating with the surrounding atmosphere, firstly via permanent orifices of low cross-section and secondly via temporary orifices of large cross-section closed by valves which open only in the direction which admits air into this inner chamber, the said permanent and temporary orifices being machined at the said leakproof contact zones.

According to a variant, the inflatable cushion consists of two walls made of a flexible material, located one inside the other and connected to one another in a discontinuous manner, on the one hand by fastenings or partitions which keep the said walls apart, and on the other hand by at least one leakproof contact zone, these walls thus delimiting two adjacent non-communicating chambers, an outer chamber connected to a source of gas under pressure and an inner chamber communicating with the atmosphere firstly via permanent orifices of low cross-section and secondly via temporary orifices of large cross-section closed by valves which open only in the direction which admits air into this inner chamber, the said permanent and temporary orifices being machined at the said leakproof contact zone.

According to a second embodiment of the safety device according to the invention, the device for expanding and reexpanding the cushion is of mechanical nature. The inflatable cushion comprises a single chamber communicating with the surrounding atmosphere, firstly via permanent orifices of low cross-section and secondly via temporary orifices of large cross-section closed by valves which open only in the direction which admits air into this chamber; furthermore, elastic means, the actuation of which is controlled by a collision detector, are combined with the said cushion to subtend the wall of the latter and to re-expand the said cushion when it has been deformed.

According to a variant of this second embodiment, the inflatable cushion is also connected to a source of gas under pressure, the actuation of which is also controlled by the collision detector.

The elastic means are springs with flexible strips which are initially wound up on themselves, or spiral springs which are initially compressed.

These springs, preferably four in number, have their bases embedded, for example, in the dashboard, and their free ends pass into the inside of the cushion or are attached to the cushion, on the outside of the latter, by fastenings.

The free ends of these springs can be protected by a pad made of elastic material.

In the case of the springs with flexible strips, it is advantageous to produce them in order to obtain a moment of inertia which increases towards the embedding position, for example, by giving them a cross-section which increases towards this embedding position.

Furthermore, the permanent orifices of low cross-section can be produced easily by using a porous wall connected to the cushion.

Figure 2:
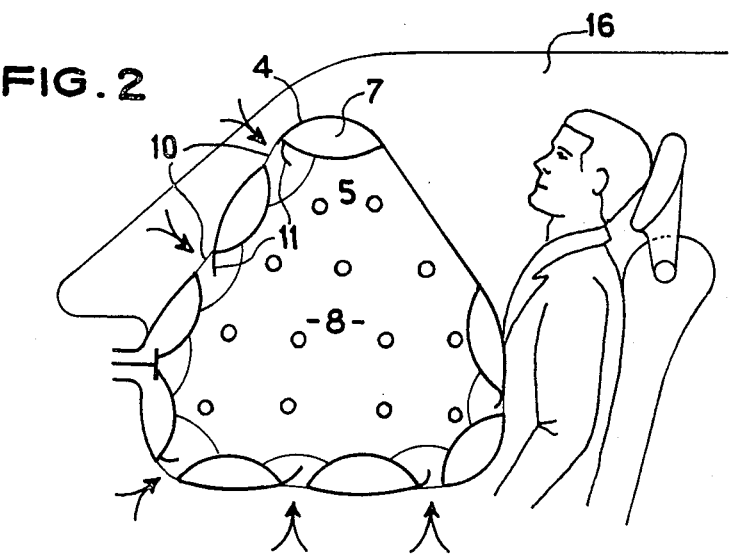
Figure 3:
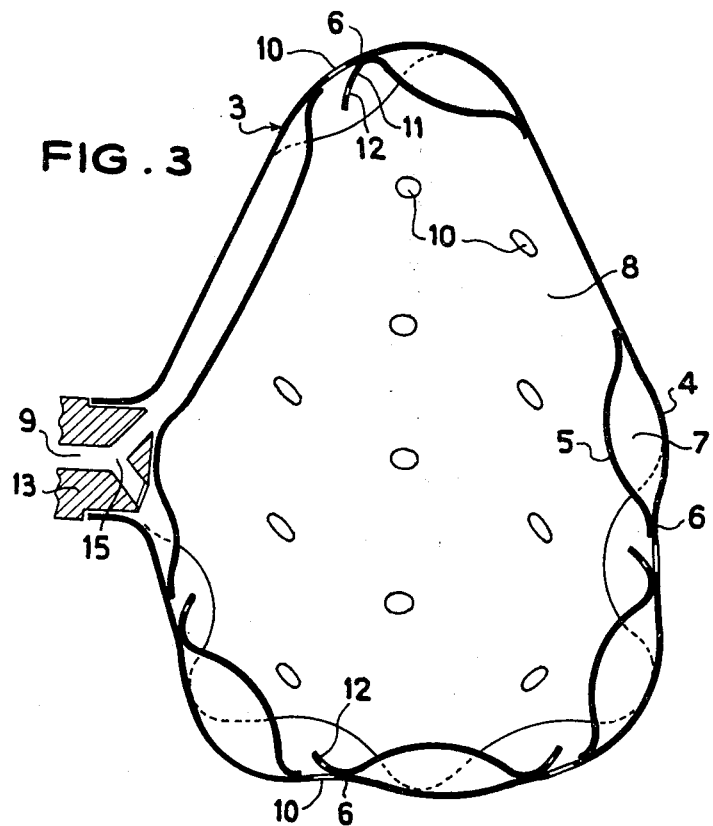
Figure 4:
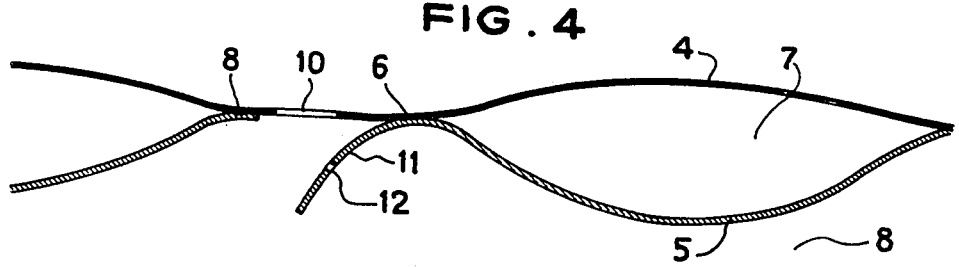
Figure 5:
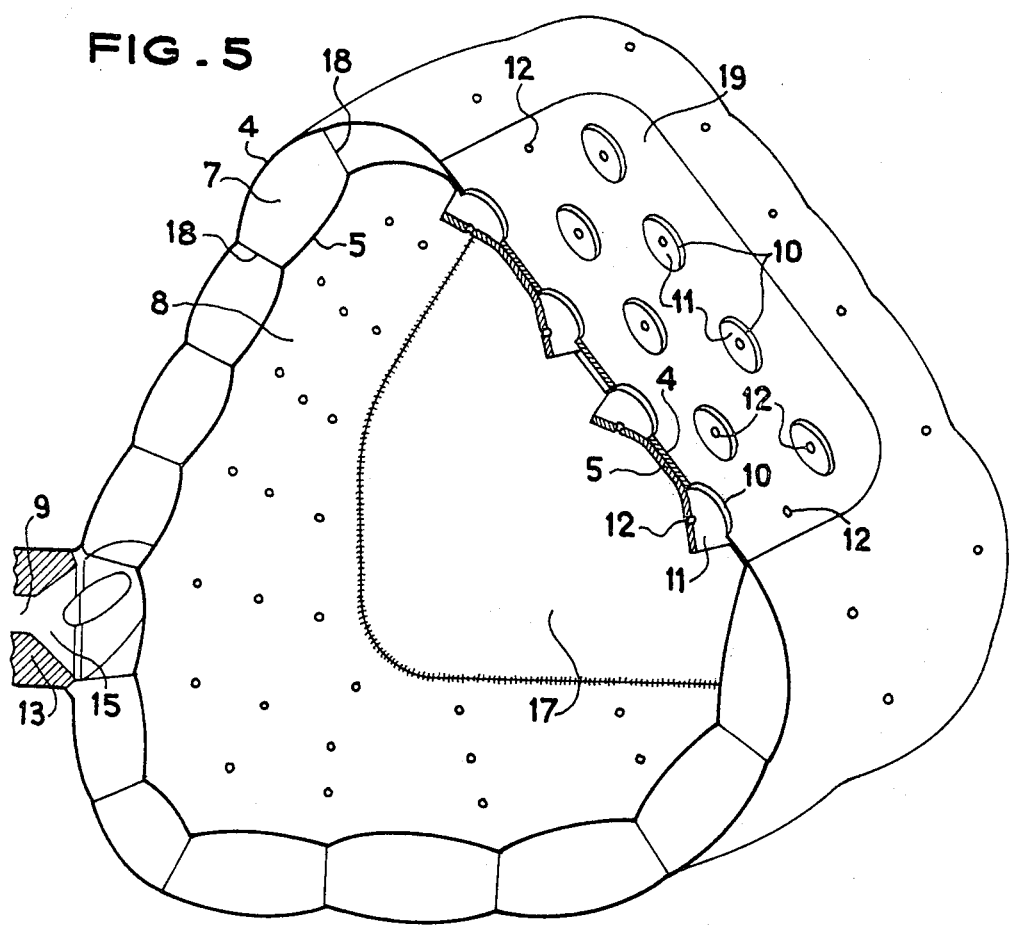
Figure 8:
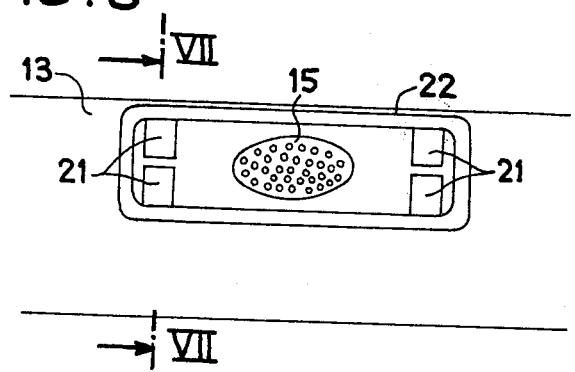
Figure 6:
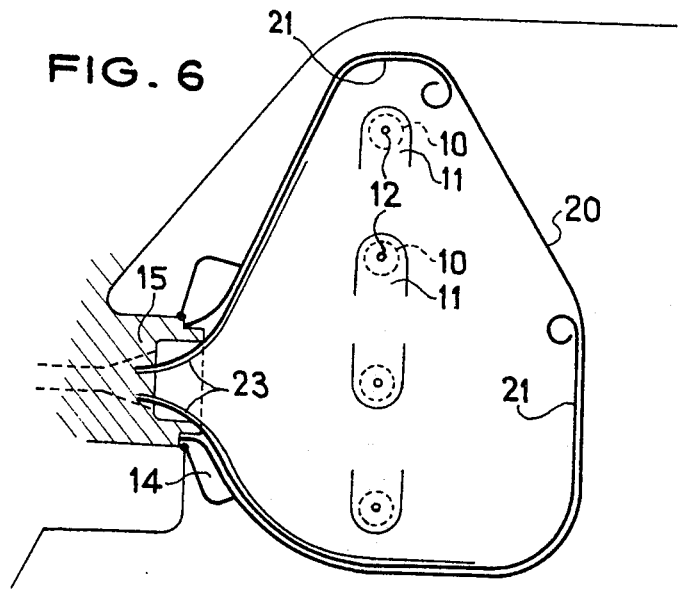
Figure 7:
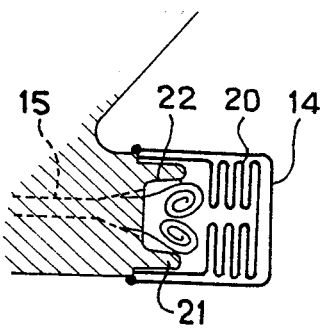
Figure 13:
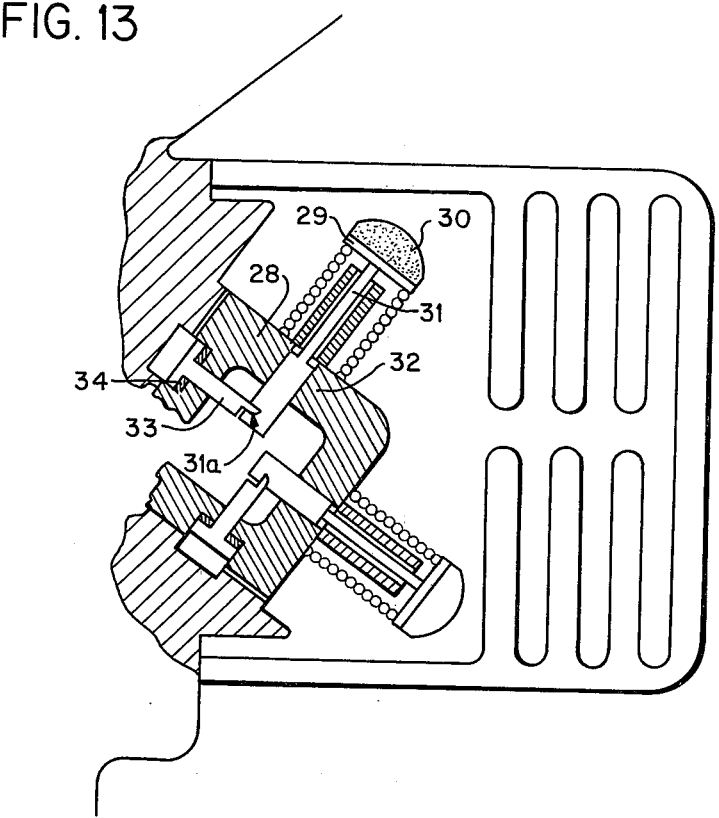
Figure 14:
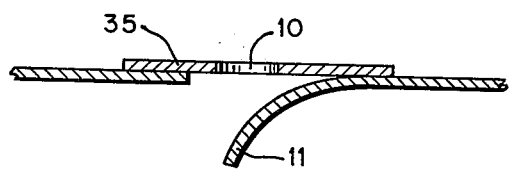
Figure 15:
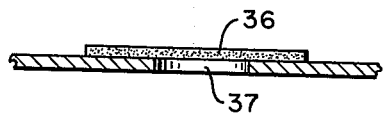

Other characteristics of the invention will be demonstrated in the description which follows, with reference to the attached drawings in which:

FIG. 1 is a schematic view in cross-section of a first embodiment of the safety device according to the invention, represented during a deadening phase of the person to be protected, FIG. 2 is a view of the same device during a re-expansion phase of the inflatable cushion, FIG. 3 is a cross-sectional view of a double-chamber inflatable cushion, FIG. 4 is a partial view in cross-section of the inflatable cushion, showing the temporary orifices of large cross-section and the permanent orifices of small cross-section, FIG. 5 is a cross-sectional view of a variant of the double-chamber inflatable cushion of FIG. 3, FIG. 6 is a cross-sectional view of a second embodiment of the safety device according to the invention, showing the cushion in the expanded position, FIG. 7 is a cross-sectional view along VII—VII of FIG. 8, showing the inflatable cushion in the storage position, FIG. 8 is a partial front view of the dashboard equipped with the device of FIG. 6, the inflatable cushion being omitted, FIG. 9 is a view in perspective of a variant represented in FIG. 6, FIG. 10 is a cross-sectional view of this variant, showing the inflatable cushion in the storage position, FIG. 11 is a view, in elevation, of a flexible strip spring of variable inertia, FIG. 12 is a cross-sectional view of a second variant of the device of FIG. 6, showing the cushion in the expanded position, FIG. 13 is a cross-sectional view of the device of FIG. 12, showing the inflatable cushion in the storage position, FIG. 14 is a partial cross-sectional view of the wall of the cushion at a membrane valve and FIG. 15 is a partial cross-sectional view of the wall of the cushion at the permanent orifices of low cross-section.

With particular reference to FIGS. 1 to 4 of the drawing, the safety device according to the invention comprises essentially a collision detector 1 controlling the actuation of a generator of gas under pressure 2 connected to at least one inflatable safety cushion 3 which expands and takes up a position between the person to be protected and the rigid structures of the vehicle which present a risk of injuring him during an accident.

This cushion comprises two walls 4 and 5, made of a flexible material, of substantially the same dimensions, located one inside the other, and connected to one another in a discontinuous manner by leakproof contact zones 6, produced for example by welding, gluing, sewing or any other suitable means, and distributed over the entire area of these walls.

The latter thus delimit two non-communicating chambers 7 and 8, namely: firstly, an outer chamber 7 consisting of elementary volumes all communicating with one another, and connected to the generator of gas under pressure 2 via the gas supply pipeline 9, and secondly, an inner chamber 8 communicating with the atmosphere via temporary orifices 10 of large cross-section equipped with membrane valves 11 which open only in the direction which admits air into the said inner chamber and oppose any leakage of air from this chamber.

Furthermore, permanent orifices 12 of small cross-section are also machined at the leakproof contact zones 6, for example on the valve 11 itself, in order to allow a restricted escape of air from the inner chamber 8 and to ensure the deadening of the person to be protected when the latter is thrown against the cushion.

The safety device described above is mounted, for example, on the dashboard 13 of the automobile, the inflatable cushion 3 being folded up or rolled up to a small volume and held in position by a holding device 14.

In the case of an accident, the collision detector 1 (for example, a detector employing the Doppler effect or an inertia detector) applies a voltage to an electrical circuit controlling the actuation of the gas generator 2 (for example, a pyrotechnic generator), and the gases liberated are conveyed via the pipeline 9 to a diffuser 15. A slight increase in pressure, for example of the order of 3 bars, makes it possible to overcome the device 14 which holds the cushion in place; the safety cushion 3 can then expand under the effect of the high rate of flow of gas which supplies only the outer chamber 7. The shaping and the expansion of this chamber creates a region of greatly reduced pressure in the centre of the cushion, and this causes the temporary orifices of large cross-section 10 to open by movement of the membrane valves 11. Admission of air into the inner chamber 8 takes place via these orifices and is maintained by the pressure difference which exists between the said inner chamber 8 and the passenger compartment of the vehicle 16.

The use of two separate chambers makes it possible to leave the outer chamber, expanded by admission of the gases coming from the generator, under pressure, and to use only the air contained in the inner chamber to bring about the dissipation of energy necessary to deaden the person to be protected. This arrangement is particularly advantageous when the gases coming from the generator, although not toxic, are unpleasant because these gases in an enclosed volume are not expelled into the passenger compartment of the vehicle.

A second advantage is achieved when these gases originate from a pyrotechnic generator and when their compositions cause a certain percentage of condensable vapours to appear, which gradually condense, leading to a decrease of pressure in the outer chamber; the choice of the pyrotechnic charge and of the refrigerant placed at the outlet of the generator makes it possible to adjust this recondensation in such a way that the final pressure obtained after a certain period of time, for example 10 seconds, is approximately 0.9 bar, it being necessary for this residual pressure to hold the person involved in the accident in position after the end of the accident. Adjustment of the decrease in this pressure makes it possible to retain, during the first seconds, a possibility of re-expanding the outer chamber in such a way as to be able to admit air into the inner chamber.

When the person to be protected is thrown against the safety cushion 3 (FIG. 1) for the first time, the pressure in the inner chamber 8 increases considerably beyond atmospheric pressure and a part of the air which it contains escapes via the permanent orifices of low cross-section 12, dissipating kinetic energy, and does so as long as the person presses against the safety cushion by his own inertia. In the case of successive impacts, for example, when a vehicle, after having struck one obstacle, is deflected towards another obstacle, during the period of time when it is travelling freely, the person to be protected no longer exerts a high pressure on the outer wall 4 (FIG. 2) of the cushion and the outer chamber 7, which functions as the re-expansion device, tends to take up its original position again and to re-expand the cushion. The effect of this new re-expansion is to cause air to be re-admitted into the inner chamber via the temporary orifices of large cross-section 10, after the membrane valves 11 have been raised.

As soon as the second impact takes place, the person is once again thrown against the safety cushion thus re-inflated, the pressure in the inner chamber increases, the membrane valves 11 close again and deadening takes place in the same way as in the intervention cycle described above.

This re-admission of air between two successive impacts makes it possible to achieve much more gentle deadening conditions than those adopted in conventional inflatable cushions, especially when the cushion has a restricted volume.

Thus the double communication between the inner chamber 8 and the atmosphere in the passenger compartment 16 makes it possible for gas to be exchanged in both directions at different flow rates: admission of air into the inner chamber takes place at a high flow rate via temporary orifices of large cross-section 10 when the pressure in the said chamber is less than atmospheric pressure; on the other hand, expulsion of air from the inner chamber takes place at a low flow rate via permanent orifices of very low cross-section when the pressure in the said chamber is greater than atmospheric pressure, which makes it possible to achieve a gradual reduction in volume of the cushion and a deadening of the person to be protected under very gentle conditions when the said person is thrown against the cushion.

Good results were obtained with a ratio between the total surface area of the temporary orifices of large cross-section and that of the permanent orifices of low cross-section of between 150 and 400.

By way of example, in the case of a safety cushion with a total surface area of 1 $m^2$, the temporary orifices occupy a total surface area of 150 to 200 $cm^2$ and the permanent orifices occupy a total surface area at most equal to 1 $cm^2$.

According to the variant represented in FIG. 5, the safety cushion consists of two substantially cylindrical walls 4 and 5, closed at their ends by end panels 17, and connected to one another in a discontinuous manner by elastic cords 18 which hold these walls at a certain distance from one another.

The latter are moreover connected to one another in a discontinuous manner by at least one leakproof contact zone 19 produced by welding, gluing, sewing or any other suitable physico-chemical means. The temporary orifices of large cross-section 10 with their membrane valves 11 equipped with permanent orifices of low cross-section 12 are machined in this zone which isolates the inner chamber 8 from the outer chamber 7.

These permanent orifices can optionally be perforated directly in the leakproof contact zone 19.

Likewise, the end panels 17 can also contain temporary orifices of large cross-section with their membrane valves which may or may not be equipped with permanent orifices of low cross-section.

According to the embodiment represented in FIGS. 6 to 8, the safety cushion consists of a single wall made of a flexible material 20, equipped on the one hand with temporary orifices of large cross-section 10 closed by membrane valves 11 and on the other hand with permanent orifices of small cross-section 12 machined in the said valves.

This cushion is inflated by means of a gas generator via a diffuser 15, whilst the device for re-expanding the cushion, after the latter has been deformed during an accident, consists of restoring springs with flexible strips 21, for example four in number, located inside the cushion at four edges and subtending the wall of the cushion. These springs are attached by their bases in a casing 22 mounted on the dashboard (FIG. 8), and the diffuser 15 opens into the inside of the said casing. These springs are optionally reinforced at their bases by shorter elastic strips 23.

FIG. 7 shows the safety cushion in the folded up position, the springs 21 being wound up on themselves, the cushion being folded up and the whole being held in position by the holding device 14.

During an accident, a collision detector controls the actuation of the gas generator and the gases given off are conveyed to the diffuser 15 through the dashboard and then into the casing 22 and into the cushion; a slight increase in pressure, for example of 3 bars, liberates the system 14 which holds the cushion, the safety cushion can then expand simultaneously under the effect of the longitudinal thrust of the gases under pressure and of the lateral thrust of the four springs with flexible strips 21. During the expansion of the cushion, the flexible strips unwind until, at the end of their path, they subtend the wall of the cushion with which they remain in contact. These restoring springs constantly tend to bring the wall of the cushion back into the expanded position when the said cushion is deformed under impact during an accident. Admission of air into the inside of the cushion via temporary orifices of large cross-section 10 and expulsion of the mixture of gas and air via the permanent orifices of low cross-section 12 during the deadening phases make it possible to achieve very gentle deadening conditions.

A variant of this embodiment is represented in FIGS. 9 to 11. The main difference from the embodiment described above rests in the fact that the restoring springs with flexible strips are outside the cushion. These flexible strips 21 are attached to the wall of the cushion by straps 24 in which they can slide freely. The storage position of the cushion in the dashboard is represented in FIG. 10: the strips, resting against one another with the cushion interposed in the middle, are wound up on themselves and held in position by the holding system 14.

According to the variant represented in FIG. 11, the flexible strips operate in flexion and if the embedded ends have to support a large amount in order that these re-expansion devices act effectively, the free ends must be flexible. The flexible strips 21 are thus produced in such a way as to obtain a moment of inertia which increases towards their embedding section and they are of variable width which decreases from the base towards the free end and they are reinforced near the embedding position by a second elastic strip 23. The free end is advantageously wound up on itself and covered by a cushion of flexible material 25 when the strips are outside the cushion.

According to the embodiment represented in FIGS. 12 and 13, the safety cushion comprises a single wall made of flexible material 26, equipped on the one hand with temporary orifices of large cross-section 10 closed by membrane valves 11, and on the other hand with permanent orifices of small cross-section 12 machined in the said valves. The source of gas for inflating the cushion is eliminated.

The expansion of the cushion or its re-expansion is achieved by helicoidal springs 27, 4 in number, located inside the cushion, along four edges, and subtending the wall of the said cushion.

These springs rest on a casing 28 mounted on the dashboard. At rest, they are compressed and locked by a system comprising a head 29 equipped with a pad 30 and firmly fixed to a rod 31 threaded through each spring, the free end of the said rod being mounted to slide in a bore 32 of the casing 28 and carrying a slot 31a into which a locking finger 33 is inserted. The unlocking of the rod is controlled by the collision detector which applies a voltage to an electrical circuit controlling the firing of a charge of powder 34 acting on the locking finger 33. The release of the springs 27 makes it possible to overcome the system 14 which holds the cushion and allows the inflatable cushion to expand; the membrane valves 11 free the temporary orifices of large cross-section 10, making it possible for air from the passenger compartment to enter the cushion wherein a reduction of pressure prevails due to the expansion of its wall propelled by the release of the springs. The process of deadening which provides effective protection during the successive impacts to which the vehicle is subjected takes place in the same way as that described above, and the re-expansion devices consist of the 4 springs.

The inflatable cushions used in the safety devices described in FIGS. 6 to 13 comprise only a single chamber and the temporary orifices of large cross-section 10 can advantageously be cut out in a detachable piece 35 (FIG. 14) on the outside of the wall of the cushion, which carries a shaped cut-out to form the tongue of the membrane valve 11.

During the deadening of the people to be protected, the escape of the air or of the gas-air mixture through the permanent orifices of low cross-section 12 can be replaced by a diffusion through a porous detachable wall 36 (FIG. 15) on the outside of the wall of the cushion, at an orifice 37 machined in the said wall. According to a variant of the device of FIG. 12, the expanding springs are located outside the inflatable cushion and slide freely in keepers according to an equivalent solution to that given for FIG. 9.

What is claimed is:

1. A safety device for protecting a passenger in a moving vehicle including successive impacts, which comprises at least one inflatable cushion, said cushion comprising two adjacent non-communicating chambers, maintained at different pressures at the time of use, the outer chamber enclosing at least partially the inner chamber, the inner chamber being capable of communicating with the atmosphere via permanent orifices of low cross-section, and via temporary orifices of large cross-section, the latter being closed by valves which open only in the direction which admits air into said inner chamber, the outer chamber being connected to a source of gas under pressure, a collision detector controlling the actuation of said gas, the walls of said two chambers being of flexible material of substantially equal dimensions and located one inside the other, connected together in a discontinuous manner by leakproof contact zones distributed over a substantial area of said walls, said permanent and temporary orifices being machined at said leakproof contact zones, the outer chamber expanding and re-expanding the cushion when it is pressurized, the inner chamber being expanded by pressurization of the outer chamber and being pressurized itself by sucking in air from the surrounding atmosphere via the temporary orifices of large cross-section, the inner chamber being depressurized by escape of air through the permanent orifices during the stage when the passenger presses against said cushion, the gas passage taking place at a low flow rate in the direction from the interior of the inner chamber to the surrounding atmosphere, for the purpose of deadening the person to be protected when the latter is thrown against the said cushion during an accident, and at a higher flow rate in the direction from the surrounding atmosphere to the interior of the inner chamber for the purpose of rapidly re-inflating the said cushion as soon as the latter is no longer acted upon by the person to be protected.

2. The device according to claim 1 wherein said leakproof contact zones are distributed over the entire area of said walls, except the portion of the cushion which comes in contact with the head of the passenger.

3. The device according to claim 1 wherein the temporary orifices are in number at least equal to 27.

4. The safety device according to claim 3 wherein the temporary orifices are formed by cut-outs in the external wall, and the internal wall in the region corresponding to said orifices forms a tongue for the valve of said orifices.

5. The device according to claim 1 wherein the surface of opening of each of the temporary orifices does not exceed 5.5cm$^2$.

6. The safety device according to claim 1, wherein the ratio of the total surface area of the temporary orifices of large cross-section to that of the permanent orifices of low cross-section is between 150 and 400.

7. A safety device for moving vehicles which comprises at least one inflatable cushion, said cushion comprising a single chamber communicating with the surrounding atmosphere, a source of gas under pressure being connected to said inflatable cushion, for inflating the cushion, at least two elastic springs for re-expanding the cushion after the cushion has been deformed, said springs comprising flexible strips wound up on themselves when the device is inoperative, means for releasing said strips upon cushion inflation, the said cushion being provided with means for passage of gas from the interior to the atmosphere and from the atmosphere to the interior of the cushion at two different flow rates, the gas passage taking place at a low flow rate in the direction from the interior of the cushion to the surrounding atmosphere, for the purpose of deadening the person to be protected when the latter is thrown against the said cushion during an accident, and at a higher flow rate in the direction from the surrounding atmosphere to the interior of the cushion for the purpose of rapidly re-inflating the said cushion as soon as the latter is no longer acted upon by the person to be protected, collision detector means for actuating said source of gas.

8. A safety device according to claim 7 wherein the strips are at least four and consist of two upper and two lower strips.

9. The safety device according to claim 7 wherein said means for releasing said strips comprise a holding system surrounding said cushion in a folded state, said holding system being responsive to said source of gas under pressure to release said cushion from the folded state.

10. The safety device according to claim 7 wherein said flexible strips vary in width and the width decreases towards the free end.

11. The safety device according to claim 7, wherein the strips are attached by their bases.

12. The safety device according to claim 7, wherein the free ends of the strips are protected by pads made of elastic material.

13. The safety device according to claim 7, wherein the free ends of the strips pass inside the cushion.

14. The safety device according to claim 7, wherein the free ends of the strips are attached to the outside of the cushion.

15. The safety device according to claim 14 wherein the strips are attached to the cushion by means of straps.

* * * * *